May 7, 1957 — A. DUZ — 2,791,104
LIQUEFIED GAS REFRIGERATOR UNIT
Filed June 28, 1956

INVENTOR
ANGEL DUZ
ATTORNEY

United States Patent Office 2,791,104
Patented May 7, 1957

2,791,104

LIQUEFIED GAS REFRIGERATOR UNIT

Angel Duz, Montevideo, Uruguay

Application June 28, 1956, Serial No. 594,631

Claims priority, application Brazil April 25, 1956

12 Claims. (Cl. 62—92)

The present invention relates to a novel refrigerating unit of great simplicity and reduced cost enabling the benefits of refrigeration to be distributed to those of small economic means and which is particularly adapted for use in isolated areas in which electricity is not readily available. The invention is especially adaptable for short duration portable use, as for example, on camping trips or similar excursions where efficient and effective refrigeration is desired under circumstances where conventional services are not available.

In accordance with the present invention, a refrigerating unit of small cost and simple construction is provided having, with the possible exception of a thermostatic control element and its associated parts, if any, no moving parts. Further, the various parts employed are simple and easily standardized and since these parts do not mechanically interact, assembly of the unit is simple contributing substantially to the economy of the product.

The invention and its objects will be more fully understood from the description of the invention which follows taken in conjunction with the accompanying drawings in which.

Figure 1:
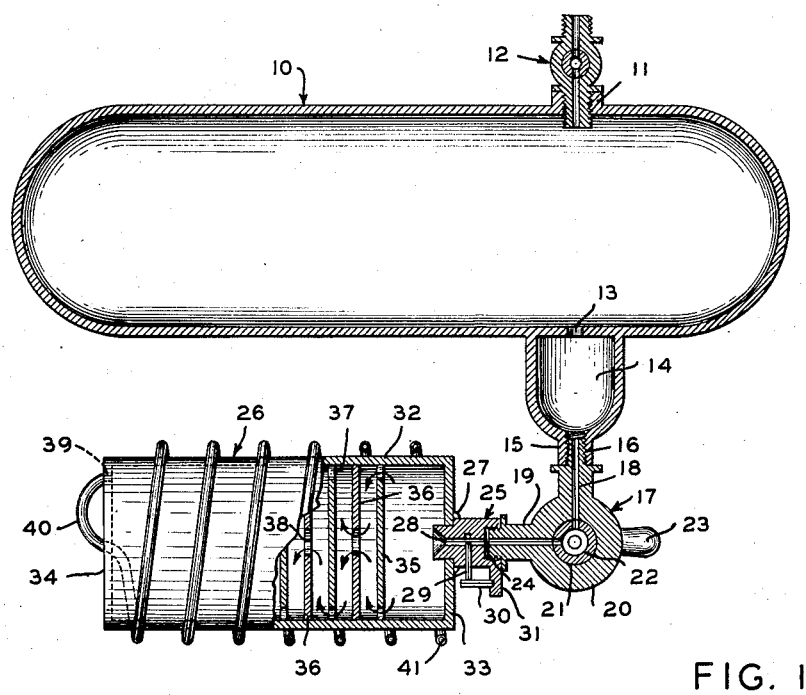
Figure 1 is a diagrammatic cross-section illustrating the present invention.

Referring to Figure 1, the numeral 10 generically designates a steel tank containing a gas under pressure, e. g. carbon dioxide. Connected to the tank 10 is a coupling 11 to which is preferably connected a stopcock 12 to permit the tank 10 to be refilled, should this be desired. Stopcock 12 is shown in its open position and is normally closed except during such time as the tank 10 is being filled. Tank 10 is also provided with a small diameter opening 13 leading to a collecting chamber 14, which in the form shown is cylindrical, terminates in a semi-spherical end and is integral with the tank 10. The semi-spherical end is formed with a coupling 15 to which is secured, as by the threaded securement 16, a stopcock indicated generically by the numeral 17.

The stopcock 17 includes an inlet 18, an outlet 19, and a generally spherical body 20 which defines an interior spherical valve chamber 21. Valve 22 is fitted within chamber 21 and is operated by handle 23. The stopcock 17 is shown in its normal open position, it being understood that stopcock 17 may be closed while the tank 10 is being filled.

Secured to the outlet 19 of the stopcock 17, as by the threaded connection 24, is an injector generally indicated by the numeral 25, the injector being in communication with an expansion chamber generically designated 26, a welded connection 27 being illustrated. As can be seen, injector 25 includes a passageway 28 through which gas under pressure or liquified refrigerant from tank 10 is supplied to the expansion chamber 26. A valve member 29 regulates the opening of the passageway 28 and valve member 29 is controlled thermostatically, as by the bimetallic bar 30 secured to supporting element 31. It will be appreciated that any suitable thermostatic control may be used to regulate the supply of pressurized refrigerant, the drawing being entirely diagrammatic and illustrative in this respect.

Figure 2:
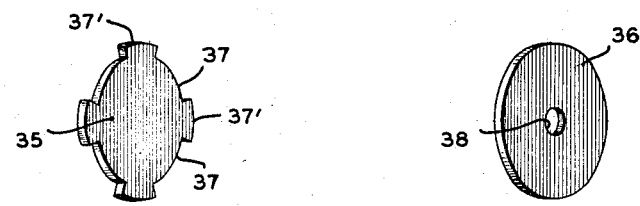
Figure 2 is a perspective view of one of the types of discs used within the expansion chamber.
Figure 3:
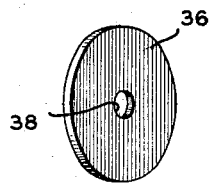
Figure 3 is a perspective view of another of the types of discs used within the expansion chamber.

The expansion chamber 26 is a closed cylindrical vessel having cylindrical side wall 32 and end walls 33 and 34 hermetically secured thereto. Secured to the interior of the wall 32 and spaced along the length thereof are a plurality of partition discs 35 and 36 which are secured in any suitable manner, as for example by welding or soldering. Partition disc 35 is more clearly shown in Figure 2 where it can be seen that disc 35 is constituted by a solid generally circular disc having peripheral cut out portions 37 formed therein to provide projections or ears 37′ which are secured to the wall 32. Partition disc 36 is shown in Figure 3 where it can be seen tht disc 36 is constituted by a solid circular member having a centrally disposed aperture 38 formed therein. The discs 35 and 36 are preferably planar, as shown. The expansion chamber 26 and the discs 35 and 36 are preferably formed of a heat conductive material such as aluminum.

The discs 35 and 36 alternate along the length of the expansion chamber 26 and force gas supplied from the injector 25 to follow a tortuous or sinuous path as indicated by the arrows in Figure 1 to encourage dissipation of heat through the side wall 32 and release thereof to the refrigerant.

The expansion chamber 26 is formed with an opening 39 remote from the injector 25. A tube 40 connects with the opening 39 and this tube is helically coiled around the cylindrical side wall 32 out of contact with the same. Preferably, tube 40 is made of copper since the porosity of this material is such as to allow maximum utilization of the refrigerant gas which passes out of the expansion chamber 26 through the tube 40. The tube 40 terminates, as shown at 41, and it will be understood that the termination of the tube 40 may be at any point which may be dictated by the circumstances of use and the refrigerant selected. When refrigerants such as carbon dioxide are employed, it is generally not necessary to lead the spent gas to some remote location since this gas is not only inexpensive, but is non-poisonous.

Utilization of the coiled tube 40 permits the last refrigerating characteristics of the expanding gases to be utilized while maintaining the refrigerating unit as a small and compact member. The spacing between the tube 40 and the wall 32 prevents the escape of gas at temperatures substantially below the temperature of the atmosphere surrounding the expansion chamber 26.

The invention provides high refrigerating capacity and opening of stopcock 17 has been found, by actual experiment, to lower the temperature of the exterior of wall 32 to a temperature of —18° C. in 22 seconds.

Using liquid carbon dioxide in the tank 10, vaporization of this liquid in expansion chamber 26 produces a decrease in temperature which results in the provision of a congealed layer of solid carbon dioxide on the inner surface of the walls 26 and the exterior surfaces of the discs 35 and 36.

The invention has been illustratively set forth and is defined in the claims which follow.

I claim:

1. In a refrigerating unit, an injector for supplying refrigerant under pressure, a closed vessel communicating with said injector and constituting an expansion chamber, a plurality of spaced apart partition discs secured to the interior of said vessel, some of said partition discs defining peripheral openings and the other of said partition discs defining centrally positioned openings, said discs alternating to force the refrigerant to follow a tortuous path through said expansion chamber, said vessel being provided with outlet means remote from said injector and a tube connected to said outlet means and coiled about said vessel, said tube communicating with the atmosphere at a point remote from said outlet.

2. In a refrigerating unit as recited in claim 1 in which said closed vessel is cylindrical and said discs are circular.

3. In a refrigerating unit as recited in claim 2 in which said closed vessel and said discs are made of aluminum.

4. In a refrigerating unit as recited in claim 1 in which said tube is spaced from the exterior of said closed vessel.

5. In a refrigerating unit as recited in claim 4 in which said tube is made of copper.

6. In a refrigerating unit as recited in claim 1 in which said injector includes thermostat means for closing said injector when a desired reduced temperature is reached.

7. An open refrigeration system comprising a source of liquid carbon dioxide, an injector communicating with said source, a closed vessel communicating with said injector and constituting an expansion chamber, a plurality of spaced apart partition discs secured to the interior of said vessel, some of said partition discs defining peripheral openings and other of said partition discs defining centrally positioned openings, said discs alternating to force the refrigerant to follow a tortuous path through said expansion chamber, said vessel being provided with outlet means remote from said injector and a tube connected to said outlet means and coiled about said vessel, said tube communicating with the atmosphere at a point remote from said outlet.

8. An open refrigeration system as recited in claim 7 in which a collecting chamber is interposed between said source and said injector.

9. An open refrigeration system as recited in claim 7 in which said source of liquid carbon dioxide comprises a tank having an opening in the lower portion thereof communicating with a collecting chamber integral with said tank and stopcock means for establishing communication between said tank and said injector.

10. An open refrigeration system as recited in claim 9 in which said tank is provided with second stopcock means for filling the same with liquid carbon dioxide.

11. An open refrigeration system as recited in claim 7 in which said tube is spaced from the exterior of said closed vessel.

12. An open refrigeration system as recited in claim 11 in which said closed vessel is cylindrical and said discs are circular and said vessel and discs are made of aluminum and said tube is made of copper.

References Cited in the file of this patent
UNITED STATES PATENTS

| | | |
|---|---|---|
| 1,876,047 | Edmonds | Sept. 6, 1932 |
| 1,876,915 | Gordon | Sept. 13, 1932 |